Patented Feb. 24, 1925.

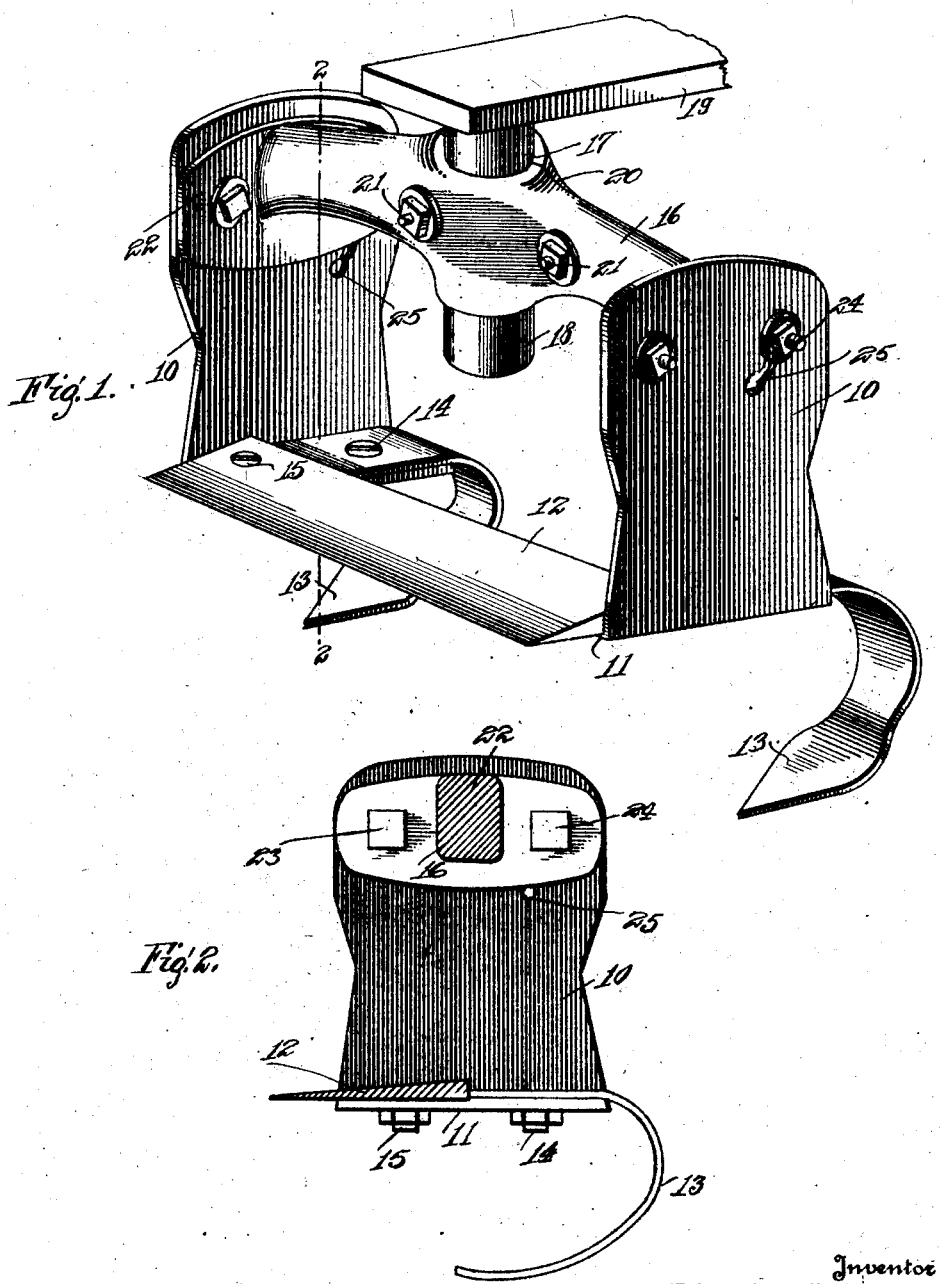

1,527,599

UNITED STATES PATENT OFFICE.

LINCOLN MARTIN, OF HARTFORD CITY, INDIANA.

CULTIVATOR AND WEEDER.

Application filed January 11, 1923. Serial No. 612,069.

*To all whom it may concern:*

Be it known that I, LINCOLN MARTIN, a citizen of the United States, residing at Hartford City, in the county of Blackford, State of Indiana, have invented certain new and useful Improvements in Cultivators and Weeders; and I do hereby declare the following to be a full, clear, and exact description of the invention, such as will enable others skilled in the art to which it appertains to make and use the same.

This invention relates to new and useful improvements in agricultural implements and particularly to weeders and cultivators.

One object of the invention is to provide an implement by means of which the weeds may be cut, below the surface of the soil, and then thrown upon the top of the soil, to permit ready and easy removal.

Another object is to provide a device of this character which is simple in construction, can be manufactured at a low cost, and which can be readily applied to the ordinary cultivators in place of the shovels.

Other objects and advantages will be apparent from the following description when taken in connection with the accompanying drawing.

In the drawing:

Figure 1 is a perspective view of the invention, associated with the shovel bar and standard of a cultivator.

Figure 2 is a vertical sectional detail view on the line 2—2 of Figure 1.

Referring particularly to the accompanying drawing, 10 represents a pair of vertical parallel metal plates, each of which has its lower end turned horizontally inwardly, as shown at 11, with the forward portion of such inturned end inclined downwardly and forwardly. Detachably secured to the upper face of the inclined portion of the lower ends of the plates 10, and extending transversely between the plates, is a downwardly and forwardly extending weed cutting blade 12, the advanced edge of which is adapted to cut beneath the soil.

Secured to the remaining, or rear horizontal portions of the inturned ends of the side plates, are the spring cultivator teeth 13, the same being secured in place by means of the screws 14, while the blade is held in position by the screws 15.

Extending between the upper ends of the side plates 10, and arching upwardly to a slight degree, is a bar 16, the same having a central eye 17 to receive the lower portion of the standard 18 of the beam 19, of the cultivator. This bar 16 is divided longitudinally, as shown at 20, and is secured together by means of the bolts 21, which also serve to frictionally bind the eye 17 to the standard 18. The opposite ends of the bar 16 are provided with the feet 22 which are bolted to the side plates by means of the bolts 23 and 24, respectively. The bolts 24 are, however, arranged for slidable adjustment in the slots 25, formed in the rear portions of the upper ends of the plates 10, and arranged in concentric relation to the bolts at the forward portions of the plates, whereby the plates 10 are thus capable of swinging adjustment on the forward bolts 23, to change the angle of the cutting blade 12, with respect to the ground, and whereby said blade may dig and cut to different depths.

It will be noted, however, that the blade 12, and the cultivator teeth 13 maintain their same relative positions when the above-named adjustment is made, whereby the deeper the blade digs and cuts, the deeper the teeth will dig into the ground, and thus bring up the cut weeds.

Attention is also called to the fact that by reason of the particular arrangement of the blade 12 and the teeth 13, the teeth will stir up the soil, after the blade has acted upon the weeds, and thereby bring the weeds up to the surface of the soil, from whence they may be easily and quickly removed.

It will also be noted that the teeth 13 dig deeper into the soil than the blade, and due to the draft the blade will be maintained at the desired depth, so that the blade will not have a tendency to throw the soil toward either side.

There is thus provided a simple and cheap device by means of which weeds may be easily and quickly removed from the soil, brought to the surface to die, and the soil properly stirred up for cultivation.

Should a standard be of slightly greater diameter than the eye 17, the parts of the bar 16 may be sprung apart to accommodate the over-sized standard, after which the bolts 21 are drawn tightly to bind the eye to the standard.

What is claimed is:

1. A combined weeder and cultivator comprising a longitudinally divided arch having a central eye for the reception of a post of a cultivator frame, depending vertical parallel members pivotally connected to the ends of the arch and being adjustable with relation to the arch angularly on the pivots thereof, the vertical members having inwardly directed ledges on their lower ends, and cultivator teeth and weeder means mounted on the ledges and extending between the members.

2. A combined weeder and cultivator comprising an arch arranged to be secured to a cultivator frame, the ends of the arch being provided with transversely extending flanges, angle plates having the upper ends of their vertical legs pivotally connected with corresponding ends of said flanges and connected with the other corresponding ends of the flanges for angular adjustment on the pivots thereof, and ground treating and weed cutting implements on the horizontal legs of said angle plates.

3. A combined weeder and cultivator comprising supports disposed in parallel relation, the lower portions of the supports being directed inwardly, the inwardly directed portions of the supports having their forward ends directed downwardly and forwardly, a weed cutting blade mounted on the downwardly and forwardly directed portions and extending between the supports, cultivator teeth mounted on the remaining parts of the inturned portions, and a transversely arranged arch connected to the supports and having an eye in the intermediate portion thereof, said arch being longitudinally divided.

4. In a combined weeder and cultivator, a support including a pair of vertical parallel members each having a single opening and an arcuate opening concentric with the single opening, cultivator teeth and a weed cutting blade mounted on the parallel members, and an arch extending between the supports and having the forward portion of each leg pivotally supported in one of the single openings and having the rear portion of each leg provided with means for adjustable engagement in the arcuate opening.

In testimony whereof, I affix my signature, in the presence of two witnesses.

LINCOLN MARTIN.

Witnesses:
CHAS. E. LORD,
REZIN DUNCAN.